June 29, 1943.  W. GERSTENKORN  2,323,027
DRILLING IMPLEMENT
Filed Sept. 25, 1941  2 Sheets-Sheet 1
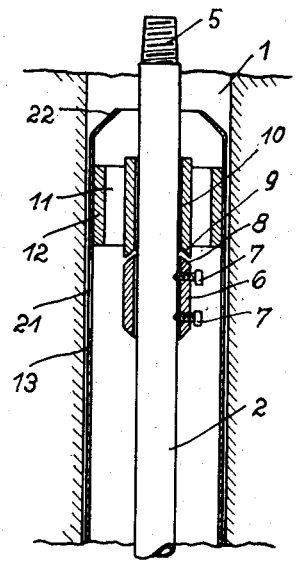
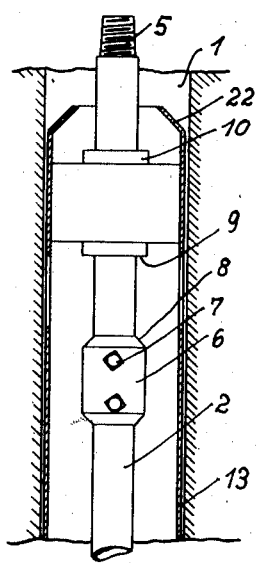
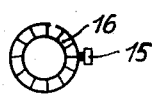
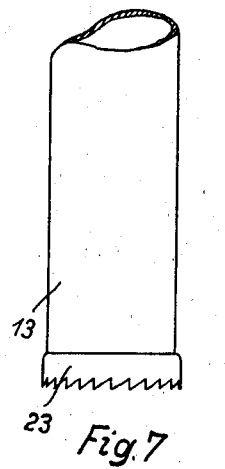
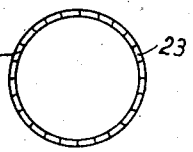
Inventor:
WILHELM GERSTENKORN
By Haseltine, Lake & Co.
Attorneys

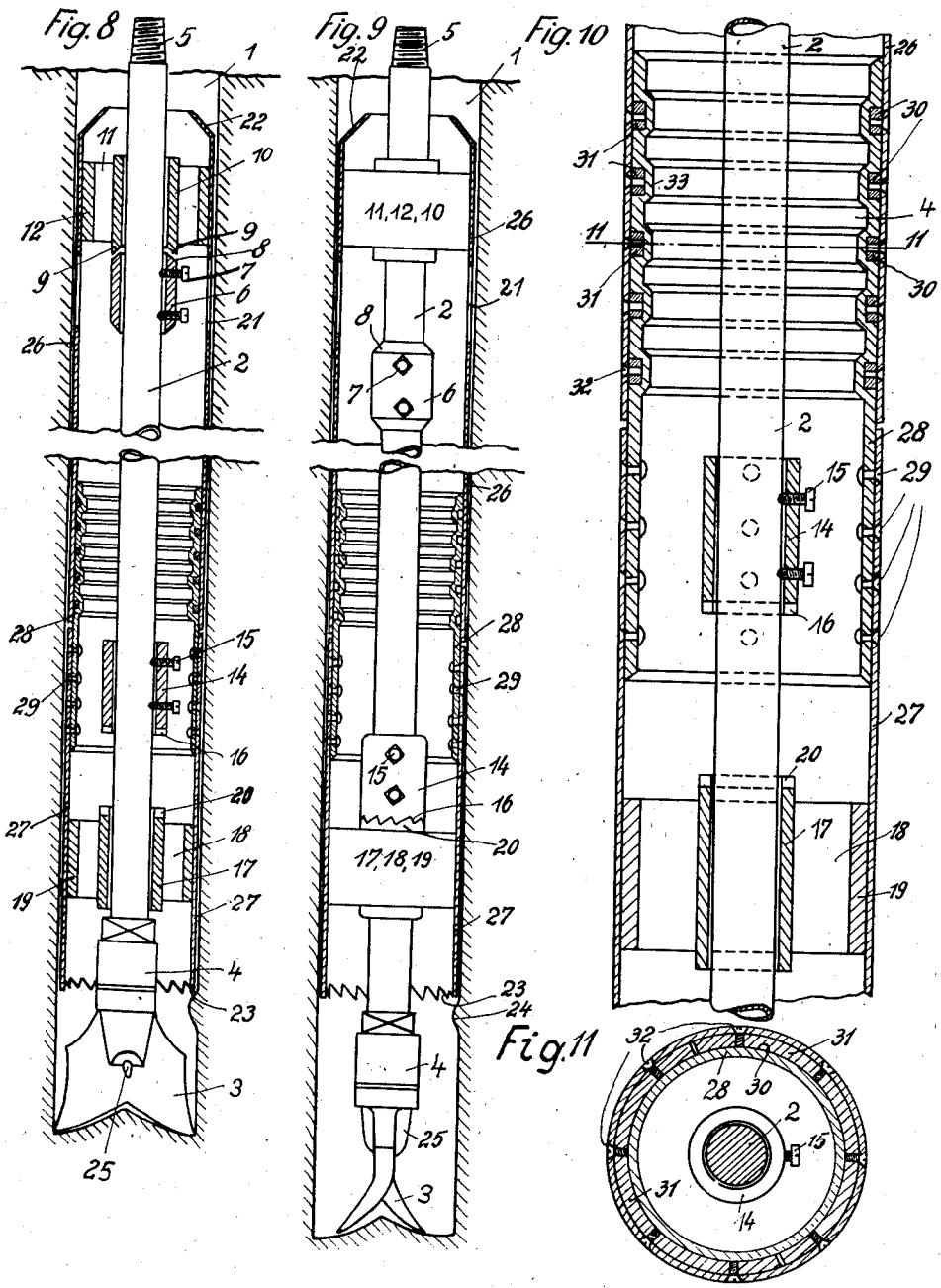

Patented June 29, 1943

2,323,027

UNITED STATES PATENT OFFICE 2,323,027

DRILLING IMPLEMENT

Wilhelm Gerstenkorn, Essen, Germany; vested in the Alien Property Custodian

Application September 25, 1941, Serial No. 412,256
In Germany February 29, 1940

2 Claims. (Cl. 255—73)

The invention relates to a drilling implement, especially suited for deep boring.

The object of the present invention is to provide a drilling implement, especially a drilling implement for deep boring, which warrants that the drill is introduced into the earth always vertically and in a straight line, also if the depth is to be comparatively great.

A constructional form of the invention is illustrated by way of example on the accompanying drawings.

Fig. 1 shows a vertical longitudinal section through a drill head with its directive body within a bore hole.

Fig. 2 shows the same in sectional view, the directive body and the drill head being, however, in another position with respect to one another.

Fig. 3 is a plan view of the guide member for the directive body.

Fig. 4 is a plan view of an adjusting member.

Fig. 5 is a plan view of a part of the clutch between the drill rod and the directive body.

Fig. 6 is a side-view of the lower part of the directive body.

Fig. 7 is a bottom view of the directive body.

Fig. 8 shows another embodiment in a vertical longitudinal section.

Fig. 9 shows a like sectional view, but in another position of the directive body and the drilling head with respect to one another.

Fig. 10 shows, drawn on a larger scale, a part sectional view illustrating how the tool is supported in the directive body.

Fig. 11 shows a section in the line 11—11 of Fig. 10.

1 denotes the bore hole in which a drill 3 is arranged in the usual manner at a drill head 4 (socket) by means of a drill rodding 2. In the constructional form shown the drill has the shape of a known fish-tail drill. The drill spindle 2 is hollow for supplying a scavenging liquid under pressure. This liquid escapes from the apertures 25 of the drill 3. At the upper end of the drill spindle is provided in the usual manner a threaded connecting piece 5 for attaching further spindle parts or drill rods if deep bore holes are to be drilled. On the drill spindle is, furthermore, a bearing body, for instance an adjusting socket 6, which can be adjusted on the drill spindle and secured in its position by screws 7. This adjusting ring 6 is conical at the frontal surface 8, and this surface contacts with a corresponding conical frontal surface 9 of a guide box 10 surrounding the drill spindle. This guide box 10 is rigidly connected by means of bearing arms 11 or a bearing-star, for instance, by the intermediary of a guide ring 12 with a directive body or shell 13 described in detail hereinafter.

On the drill spindle 2 is a second adjusting member, for instance an adjusting ring 14, adjustably fixed by means of screws 15, and this adjusting ring bears at its lower side a clutch member designed, in the constructional form shown, as a toothed surface 16. At the lower end of the directive body is another guide box 17 for the drill rod 2, and this guide box is likewise connected with the directive shell 13 by means of bearing arms or a bearing star 18, preferably by the intermediary of a insertion ring 19. The bearing or guide box 17 is at its upper side provided with a clutch member 20 designed in the constructional form shown, as a toothed coupling member and able to co-operate with the toothing 16 of the adjusting part 14.

The directive shell 13, the diameter of which is preferably a little smaller than the diameter of the drill, consists of a cylindrical tubular body arranged behind the drill head proper and provided at suitable places with a plurality of apertures 21 affording access to the drill spindle. The directive shell 13 is conically tapered at its upper end, as indicated at 22, and is there provided with a plurality of apertures (not shown). The lower frontal side of the directive shell 13 is designed as a drilling or milling tool and is provided for this purpose with a milling cutter 23 which can be exchangeably connected with the directive shell 13.

The drilling implement designed according to this invention can advantageously be employed also for ram boring.

The clutch members used in connection with the construction form illustrated, viz. the adjusting ring and the boxes 14 and 17, designed without the toothed coupling parts 16 and 20 may be designed as simple friction disks or as ramming surfaces so that when the drill is driven forwardly and if projecting rock parts or untrue portions and the like in the bore hole appear when the movement of the directive shell remains back after the forward movement of the drill head, the directive shell will be taken along in a jerky manner over the ramming or friction faces. It is, with this constructional form, suited to the object in view to provide at the lower end of the directive body a chisel shoe instead of a milling cutter shoe.

The device according to the invention operates as follows: The drilling implement is inserted into a shaft as usually provided for in the case of deep drilling, and secured in place therein by crossed members. Thereafter the drill spindle 2 is turned by known means and the drilling operation commences in the desired direction vertically or obliquely. When the drill 3 moves downwardly together with the spindle 2 first a connection is established between the drill spindle and the directive body by means of the clutch parts 16 and 20, so that the drill and the directive body are screwed in common into the bore hole. After the drill spindle and the directive body have been worked down into the bore hole for a certain length and the directive body has become disconnected from the crossed pieces it follows the drill sliding under its natural weight, disconnects the clutch connection and remains hanging with its upper bearing member 10 upon the bearing body 6 of the drill spindle 2.

Now the directive shell bears with its bearing members 10, 11, 12 and by the intermediary of the conical surface 9 upon the conical surface 8 of the adjusting ring 6 and is moved downwardly together with the drill head, there being, however, no transmission of the rotary motion from the drill spindle to the directive body. In this position the second adjusting ring 14 with the clutch part 16 is out of engagement with the other clutch part, as shown in Fig. 1. The directive shell follows downwardly sliding in correspondence with the forward movement of the drill spindle 2.

It may be assumed that a piece of rock or the like projects into the bore hole while the drill proceeds; then the directive body 13 will be retained by that projecting piece. This piece is denoted 24 in the Figs. 1 and 2. When the drill spindle 2 now continues to get down together with the drill a relative movement takes place between the now stationary directive shell 13 and the drill spindle 2 in the direction of the longitudinal axis of these members. Simultaneously with this movement the clutch part 14, 15, 16 approaches upon the drill spindle 2 the other clutch part 17—20 of the directive body and after a sufficient downward movement of the drill spindle 2 the two clutch parts 16 and 20 are coupled with one another. This position is shown in Fig. 2. The connection between the drill spindle and the directive body can also take place when the drill 3 has bored the bore hole not accurately circular. From this moment, the drill spindle continuing to rotate, the directive shell 13 is rotated with it and the tool 23 removes the piece 24 projecting into the bore hole, or corrects the untrue portion of the same. As soon as this unevenness has been done away, the directive shell can freely slide down by reason of its natural weight, whereby the coupling between the parts 16 and 20 will be automatically interrupted and the directive shell or directive body follows the drill, its bearing guiding member contacting again with the bearing member 6 of the drill spindle 2. The directive shell prevents, therefore, the bore from being deflected by the above mentioned obstacle 24 and the vertical or straight-lined direction is re-established.

This procedure will be repeated as often as untrue portions tending to deflect the drill spindle from the straight direction will arise.

When the drill must be exchanged or re-ground, generally the entire rodding is raised together with the directive shell, in which case this shell smoothes the wall of the drill hole.

In the embodiment shown in Figs. 8–11 the parts with the letter references 1 to 25 correspond to the parts of the embodiment shown in Figs. 1–7.

In the embodiment of Figs. 8–11 the directive body consists of two parts, viz. a longer upper part 26 and a shorter lower part 27 which both have the same diameter. Into the upper end of the lower part 27 is inserted a sleeve or the like 28 which is rigidly connected with the part 27 by means of rivets 29. This sleeve extends partly into the lower end of the directive shell 26 and is provided on its outer circumferential surface with a plurality of annular recesses 30 serving for the reception of bearing rings or guide rings 31, preferably divided ones. The rings 31 are held at the inner side of the upper part 26 of the directive body for instance by screws 32. There is obtained in this way a bearing similar to a collar bearing. It is from reasons of stability suitable to provide thick portions 33 within the sleeve 28 at those parts where the recesses for the bearing rings are to be produced.

Also in this embodiment the directive shell is preferably narrowed at its upper end in order to prevent that it jams at the wall of the bore hole when being withdrawn therefrom. Instead of the bearing arrangements shown or in connection therewith any suitable packings of leather, rubber or stuffing box packings may be provided.

The device operates similarly as described in connection with the example of Figs. 1–7 with the difference that when the drilling spindle and the directive body are coupled only the lower part 27 with the auxiliary drilling tool 23 is rotated while the upper part 26 of the directive body remains stationary. This position is shown in Fig. 9.

With a drilling implement designed according to this embodiment only the small additional energy for rotating the auxiliary drilling tool has to be supplied from the drive. If the bearing between the two parts of the directive body must again be lubricated it is only necessary to remove the fastening means 32 for the divided rings 31 of the collar bearing and to press the Stauffer lubricating grease or the like thereinto.

The directive body of the invention may be built up by a plurality of commercial steel tubes. If with very deep bore holes the employment of only one directive body consisting of only one tubular piece or composed of a plurality of such pieces should be insufficient, several such bodies or tubings suitably spaced may be added. The added directive bodies need not, of course, a clutch connection with the driving member of the drilling implement.

Corresponding with the weight and the desired size of the directive shell a plurality of adjustable supports for the directive shell can be provided when practising the invention. There exists also the possibility to provide a plurality of clutches—if necessary—between the drill rod and the directive shell.

I claim:

1. In a well drilling device having a rotatable shank adapted to be driven and provided upon the end thereof with a drilling head or cutter, and a shell or sleeve surrounding said shank and provided upon one end with cutting teeth, the feature including a one-way clutch disposed within said sleeve having one portion secured to the interior of the same and a corresponding portion fixed upon said shank.

2. A well drilling device according to claim 1, having the sleeve spaced a distance outside the shank so as to provide a passage for borings to be passed through the same about said shank, the latter being rotatively dissociated from said sleeve except through said clutch and a bearing for said sleeve on said shank.

WILHELM GERSTENKORN.